United States Patent
Dyson, Jr.

(10) Patent No.: US 10,507,934 B1
(45) Date of Patent: Dec. 17, 2019

(54) THERMAL MANAGEMENT SYSTEM

(71) Applicant: United States of America as represented by the Administrator of NASA, Washington, DC (US)

(72) Inventor: Rodger W. Dyson, Jr., Elyria, OH (US)

(73) Assignee: United States of America as Represented by the Administrator of National Aeronautics and Space Administration, Washington, DC (US)

(*) Notice: Subject to any disclaimer, the term of this patent is extended or adjusted under 35 U.S.C. 154(b) by 505 days.

(21) Appl. No.: 15/344,661

(22) Filed: Nov. 7, 2016

Related U.S. Application Data (60) Provisional application No. 62/251,989, filed on Nov. 6, 2015.

(51) Int. Cl.
| | | |
|---|---|---|
| B64D 41/00 | (2006.01) | |
| B64D 33/08 | (2006.01) | |
| B64D 27/16 | (2006.01) | |
| B64D 37/34 | (2006.01) | |
| F02C 6/18 | (2006.01) | |

(52) U.S. Cl.
CPC ............ *B64D 33/08* (2013.01); *B64D 27/16* (2013.01); *B64D 37/34* (2013.01); *B64D 41/00* (2013.01); *F02C 6/18* (2013.01); *F05D 2220/323* (2013.01)

(58) Field of Classification Search
CPC .. F25B 27/02; F25B 9/145; F25B 2309/1403; F25B 2309/1407; B64D 33/08; B64D 37/34; F02C 6/18; F02G 2243/54
See application file for complete search history.

(56) References Cited

U.S. PATENT DOCUMENTS

| | | | | |
|---|---|---|---|---|
| 4,584,840 A * | 4/1986 | Baumann | .................. | F25B 9/14 60/517 |
| 4,722,201 A * | 2/1988 | Hofler | ..................... | F25B 9/145 60/516 |
| 4,858,441 A | 8/1989 | Wheatley et al. | | |
| 5,901,556 A * | 5/1999 | Hofler | ..................... | F03G 7/002 62/467 |
| 6,374,617 B1 | 4/2002 | Bonaquist et al. | | |
| 7,131,288 B2 * | 11/2006 | Toonen | ................. | F28F 13/003 62/324.1 |
| 2004/0093865 A1 * | 5/2004 | Weiland | ................ | F02G 1/0435 60/520 |
| 2006/0119224 A1 * | 6/2006 | Keolian | ................ | H01L 41/113 310/339 |
| 2008/0223579 A1 | 9/2008 | Goodwin | | |
| 2011/0162827 A1 | 7/2011 | Riley | | |

(Continued)

*Primary Examiner* — Philip J Bonzell
*Assistant Examiner* — Tye William Abell
(74) *Attorney, Agent, or Firm* — Robert H. Earp, III; William M. Johnson (57) ABSTRACT

A thermal management system for an aircraft is provided that includes thermo-acoustic engines that remove and capture waste heat from the aircraft engines, heat pumps powered by the acoustic waves generated from the waste heat that remove and capture electrical component waste heat from electrical components in the aircraft, and hollow tubes disposed in the aircraft configured to propagate mechanical energy to locations throughout the aircraft and to transfer the electrical component waste heat back to the aircraft engines to reduce overall aircraft mass and improve propulsive efficiency.

20 Claims, 6 Drawing Sheets

(56) References Cited

U.S. PATENT DOCUMENTS

| | | | |
|---|---|---|---|
| 2013/0092350 A1* | 4/2013 | N. | F01D 5/084 165/51 |
| 2015/0207157 A1* | 7/2015 | Ono | H01M 8/04007 429/408 |
| 2016/0007773 A1* | 1/2016 | Renshaw | A47G 9/0215 62/6 |
| 2016/0177802 A1* | 6/2016 | Courtes | F01N 5/02 60/320 |

* cited by examiner

THERMAL MANAGEMENT SYSTEM

CROSS-REFERENCE TO RELATED APPLICATIONS

This application claims the benefit of U.S. Provisional Patent Application Ser. No. 62/251,989 entitled "Flight-Weight Electric Aircraft Propulsion Thermo-Acoustic-Based Thermal Management System" filed on Nov. 6, 2015. The entirety of the above-noted application is incorporated by reference herein.

ORIGIN OF THE INVENTION

The invention described herein was made by employees of the United States Government and may be manufactured and used by or for the Government for Government purposes without the payment of any royalties thereon or therefor.

BACKGROUND

Full-scale electric aircraft requires approximately 50 MW of electric power to be delivered to electric motor propulsors that are strategically distributed throughout the aircraft for optimal system performance. The complete power system including a turbo-generator, distribution, protection, converters, and motors all generate heat that must be dissipated. Studies suggest that over half the mass associated with a full electric power propulsion system is attributed to the thermal management system and as such is likely a key limiting factor to achieving economical flight. Moreover, as the operating temperature is reduced, the power and motor components become flight-weight and more efficient but often at the expense of increased thermal management system mass. In particular, the best system performance is predicted to occur at cryogenic temperatures. Ideally the aircraft thermal management system can lift 500 kW or more of heat from 50K to 300K with a mass of 3 kg/kw or 1500 kg overall.

Today's aircraft generators are cooled convectively with jet fuel that is readily available at ambient temperatures. This is safe because the aircraft bus voltage is below the Paschen curve at 270V. Even if the insulation fails, a spark is not likely to form and ignite nearby jet fuel. Future aircraft, however, requires a bus voltage of over 4500V to keep the overall system mass and efficiency optimized for flight. At these high voltages a spark could ignite standard jet fuel as well as the alternative cryogenic fuels such as liquid methane/hydrogen.

A second approach is to provide an inert cooling fluid such as liquid nitrogen and utilize a heat pump such as reverse Brayton to refrigerate the fluid. This, however, is difficult to achieve flight-weight systems with that approach due to system complexity, which includes coolant pumps, vacuum jacketed plumbing, size-able heat exchangers and recuperation mass. Further, such a system will deplete power from the turbo-generators to operate the turbo-alternators. For cryogenic systems it is not likely possible to directly shaft connect the warm turbo-generator to the cryogenic turbo-alternator or other combinations in which an ambient component would be connected to a cryogenic component. Other approaches such as convective air cooling are inadequate for the amount of heat lift required in full-scale electric aircraft.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

In one aspect, the innovation disclosed herein comprises a thermal management system for an aircraft that includes a plurality of thermo-acoustic engines configured to absorb waste heat from a plurality of aircraft engines, a plurality of heat pumps configured to absorb electrical component waste heat from electrical components of the aircraft, a plurality of first hollow tubes disposed in the aircraft configured to propagate mechanical energy to locations throughout the aircraft, and a plurality of second hollow tubes configured to transfer the electrical component waste heat to the aircraft engines.

In another aspect, the innovation disclosed herein comprises a method of utilizing waste heat from an aircraft engine that includes providing a thermal management system having a plurality of thermo-acoustic engines, a plurality of heat pumps, and a plurality of acoustic hollow tubes and a plurality of heat pipe hollow tubes that transfer mechanical energy and waste heat respectively, capturing engine waste heat from the aircraft engine by a thermo-acoustic engine, converting the engine waste heat into mechanical energy, propagating the mechanical energy along the plurality of acoustic hollow tubes, converting the mechanical energy into usable electric energy, powering aircraft electrical components including the plurality of heat pumps with the usable electric and/or mechanical energy, absorbing electrical component waste heat by a cold heat exchanger of the heat pumps, raising a reject temperature of the electrical component waste heat, and preheating fuel and/or air supplied to the aircraft engine.

In still another aspect, the innovation disclosed herein includes a system to increase efficiency of a turbofan jet engine on an aircraft that includes a plurality of thermo-acoustic engines configured to absorb waste heat from a plurality of aircraft engines, a plurality of heat pumps configured to absorb electrical component waste heat from electrical components of the aircraft, a plurality of acoustic wave hollow tubes disposed in the aircraft configured to propagate mechanical energy to locations throughout the aircraft, and a plurality of heat pipe hollow tubes configured to transfer the electrical component waste heat to the plurality of aircraft engines.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details.

While specific characteristics are described herein (e.g., thickness, orientation, configuration, etc.), it is to be understood that the features, functions and benefits of the innovation can employ characteristics that vary from those described herein. These alternatives are to be included within the scope of the innovation and claims appended hereto.

While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

Disclosed herein is an innovative light-weight and fuel efficient thermal energy management system for electric aircraft propulsion systems for both ambient and cryogenic systems in accordance with an aspect of the innovation. As mentioned above, a key problem with current ambient and cryogenic aircraft propulsion systems is the mass burden of cooling the high power electric motors and electronics. The anticipated significant mass addition required for thermal management can nullify the entire benefit of utilizing electric propulsion in aircraft due to the additional induced drag on the aircraft. Moreover, the traditional method of cooling aircraft generators with standard jet fuel is not cold enough for use in future flight-weight cryogenic systems. Still further, the much higher voltages required for flight weight systems (4.5 kV vs. 270V) introduces additional spark ignition hazards associated with alternative cryogenic cooling fuels including liquid methane or liquid hydrogen.

In order to overcome these disadvantages, the innovative thermo-acoustic-based thermal energy management system uses waste energy from turbo-generators to thermos-acoustically create a pressure wave that is delivered, via a routed duct work, to pulse-tube coolers located at all components requiring cooling in the aircraft. In other words, the thermal management system uses aircraft engine waste heat to produce a high intensity acoustic wave with no hot moving parts that can be used for power generation or component cooling. A temperature gradient between hot and cold heat exchangers in a heat engine efficiently creates the acoustic waves. The innovative thermal management system can be used for both cryogenic and ambient electric aircraft and can be cooled with minimal mass, fuel, and risk with the innovative thermal management system.

As mentioned above, the thermal management system uses normally wasted energy from turbofan propulsion, which is considerable in large aircraft. For example, the Boeing 737 passenger transport aircraft utilizes open cycle Brayton turbofan propulsion engines, which generate about 50 MW of thrust, but waste about 45 MW of the available fuel energy through the exhaust. The typical exhaust temperatures are about 850° C. which are ideal for a bottoming cycle. The innovative thermal management system recovers this waste heat energy and uses it to drive a thermo-acoustic based ambient or cryogenic heat pump.

Several embodiments are possible including channeling some of the hot exhaust gases directly into a thermo-acoustic engine to internally heat it, or to convectively heat the external portion of the engine using turbine exit fins in the exhaust, or to utilize the electric energy from a turbo-generator to drive a pulse-tube generator. In each of the above cases, an acoustic wave is developed that can quietly and efficiently transfer energy via a traveling wave to each component requiring cooling through a hollow channel/tube. An acoustic heat pump can then be located directly at each motor and converter to provide cooling using the energy delivered in the tube. Each heat pump can be two stages, which is beneficial for keeping the environmental heat out while also rejecting the heat generated from within the power system. Further, because the heat pump itself can reject heat at higher than ambient temperature this reduces the size and mass of radiating fins.

Figure 1:
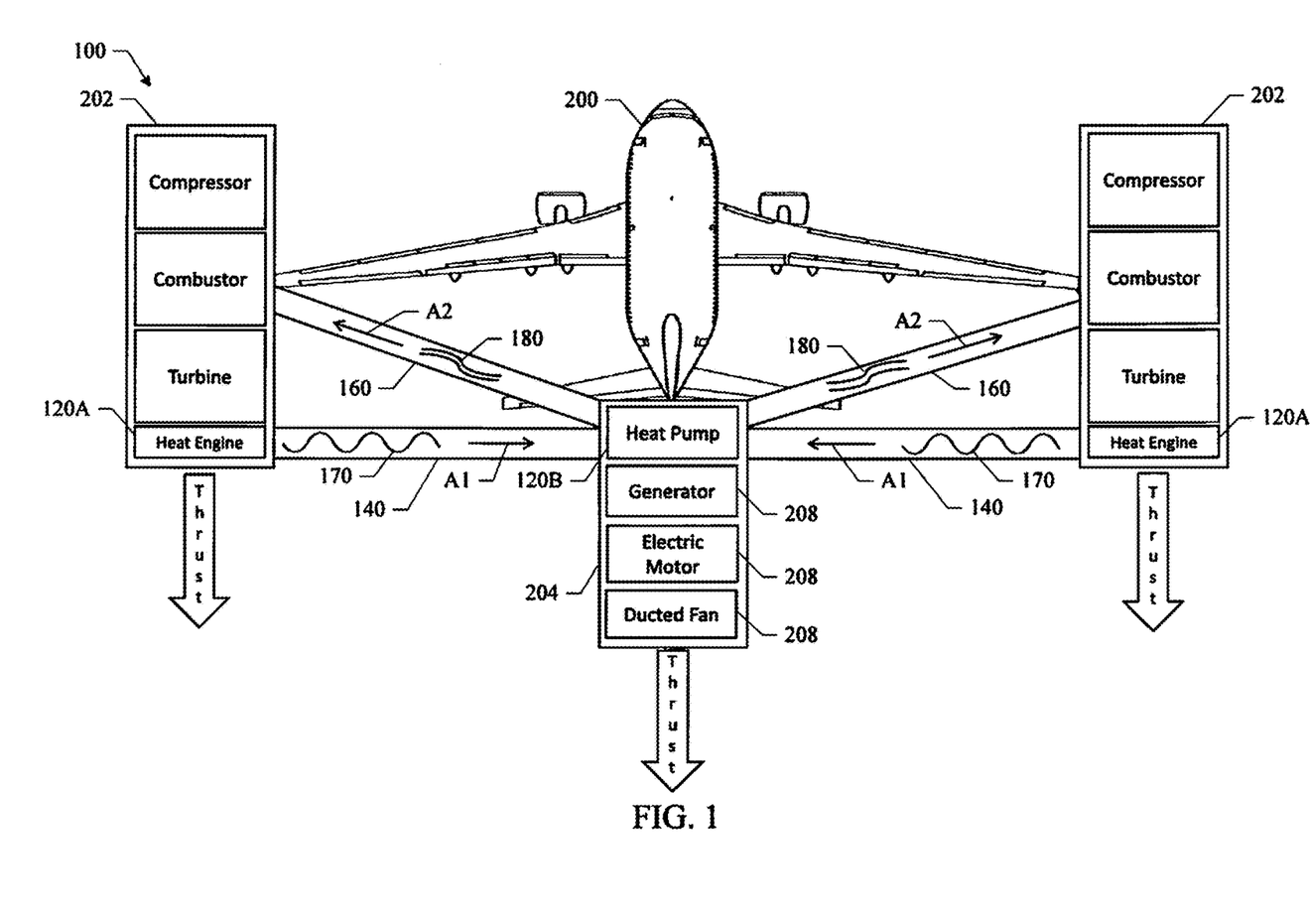
FIG. 1 is a schematic illustration of an innovative thermal management system for an aircraft in accordance with aspects of the innovation.

Referring now to the drawings, FIG. 1 is an overall system representation of an innovative thermal management system 100 for use on an aircraft 200 in accordance with an aspect of the innovation. The thermal management system 100 takes advantage of engine waste heat to create power generation, operate electrical components on the aircraft, and increase the efficiency of the aircraft engines.

The thermal management system 100 includes heat exchangers 120, one or more first hollow tubes (acoustic tubes) 140, and one or more second hollow tubes (heat pipes) 160. The thermal management system 100 extracts or captures waste energy from turbofan aircraft engines 202 using thermos-acoustic technology that converts heat into an acoustic (sound) wave 170. Since sound waves can transfer energy over a distance, the sound wave delivers energy throughout the aircraft 200, which is converted into usable electric energy using a transducer such as a linear alternator or piezoelectrics and can be used to operate electric aircraft components including electric propulsion engines 204. The delivered energy can also be used to operate a heat pump, which removes heat from electrical components and raises the reject temperature to approximately 400-600° C. so that the heat can be returned back to the turbofan engine via a heat pipe. This returned heat can be used to preheat the fuel or air for the turbofan engine.

Figure 2:
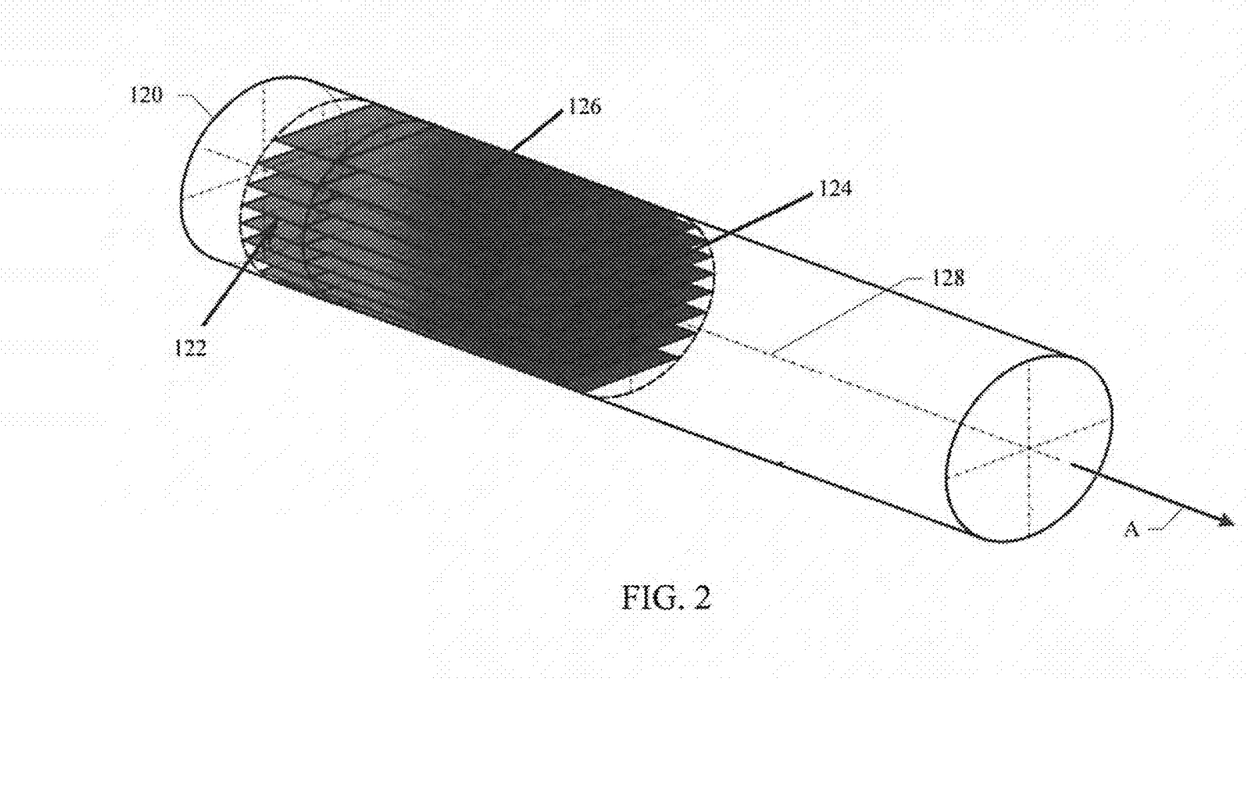
FIG. 2 is a perspective view of a heat exchanger including hot region, regenerator, and cold region in accordance with aspects of the innovation.
Figure 3:
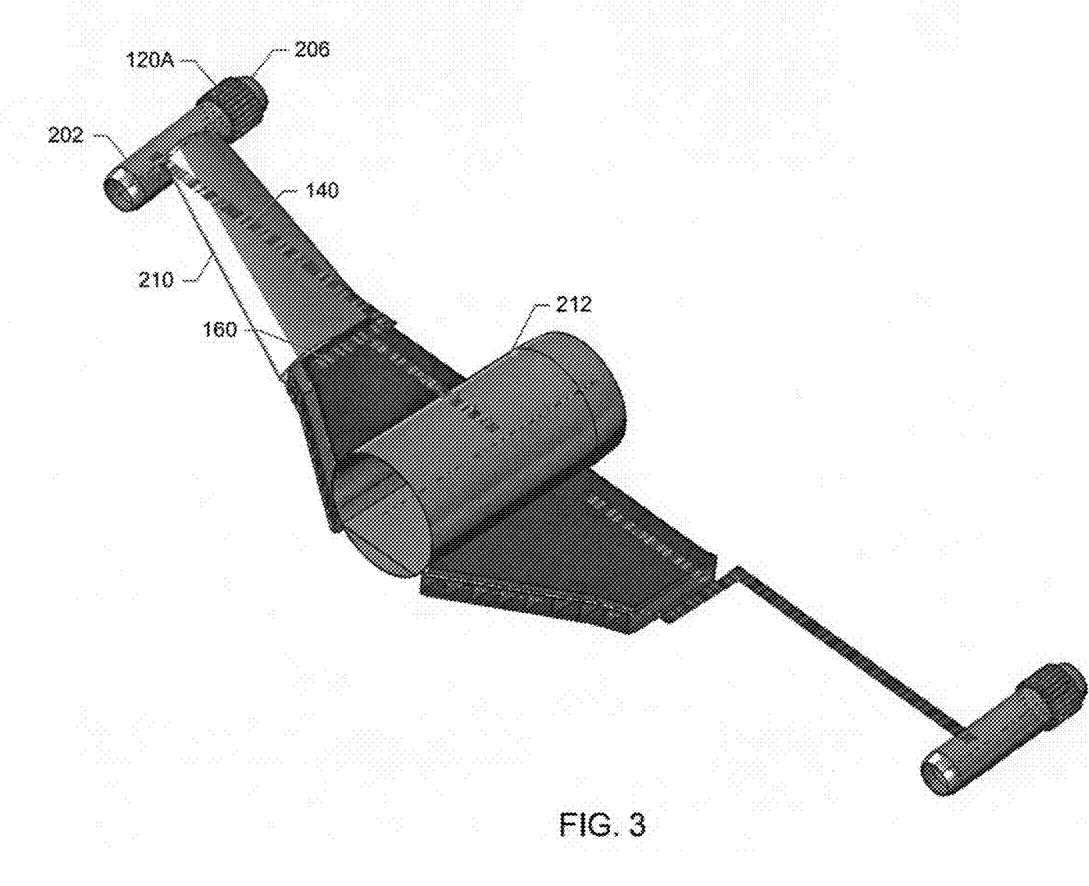
FIG. 3 is a perspective view of a wing and engine section of an aircraft illustrating a location of hollow acoustic wave tubes of the thermal management system in accordance with aspects of the innovation.
Figure 4:
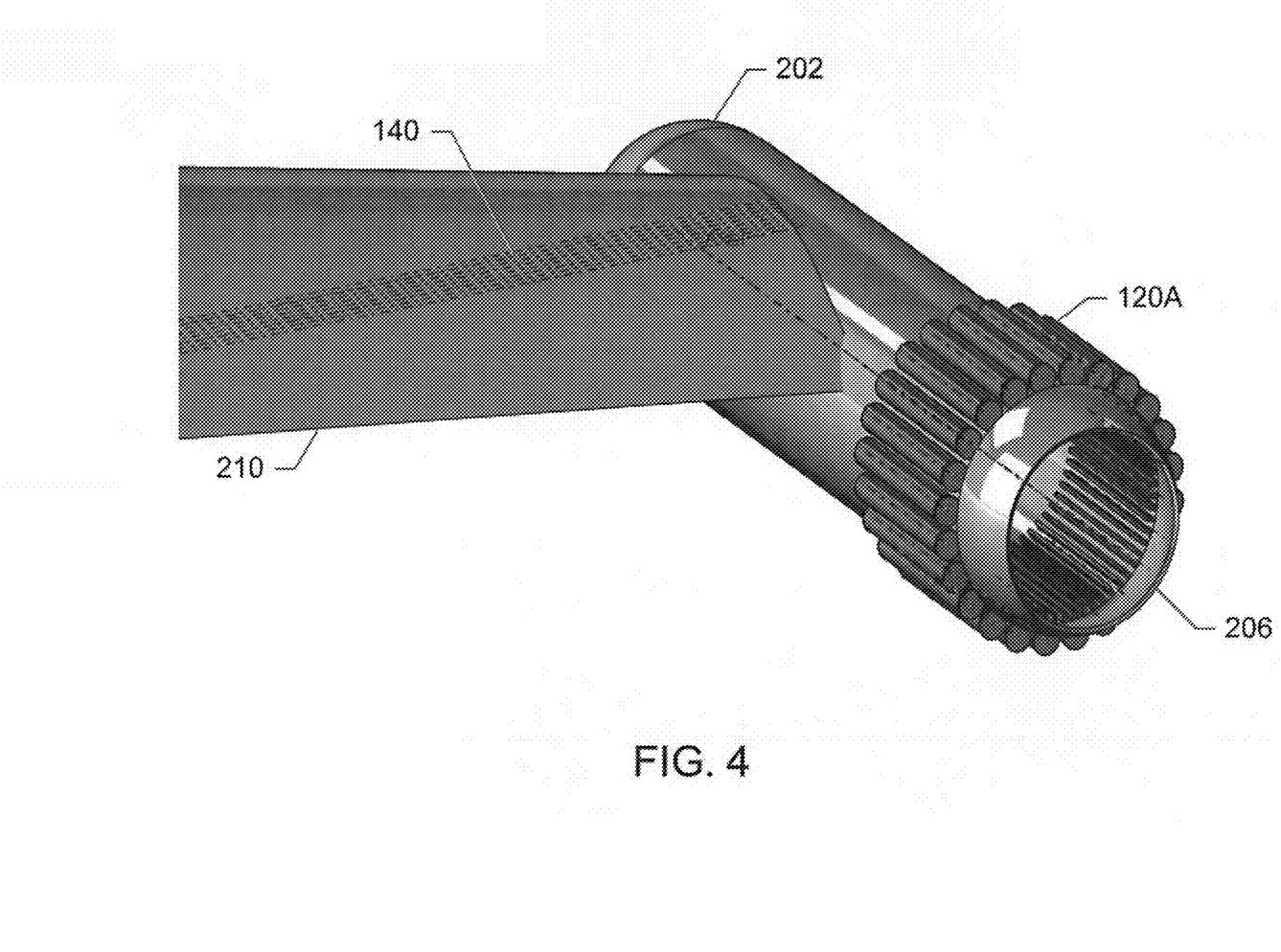
FIG. 4 is a close up view of a turbofan engine illustrating one example embodiment of a location of thermo-acoustic engines that utilize the waste heat exhaust in accordance with aspects of the innovation.
Figure 5:
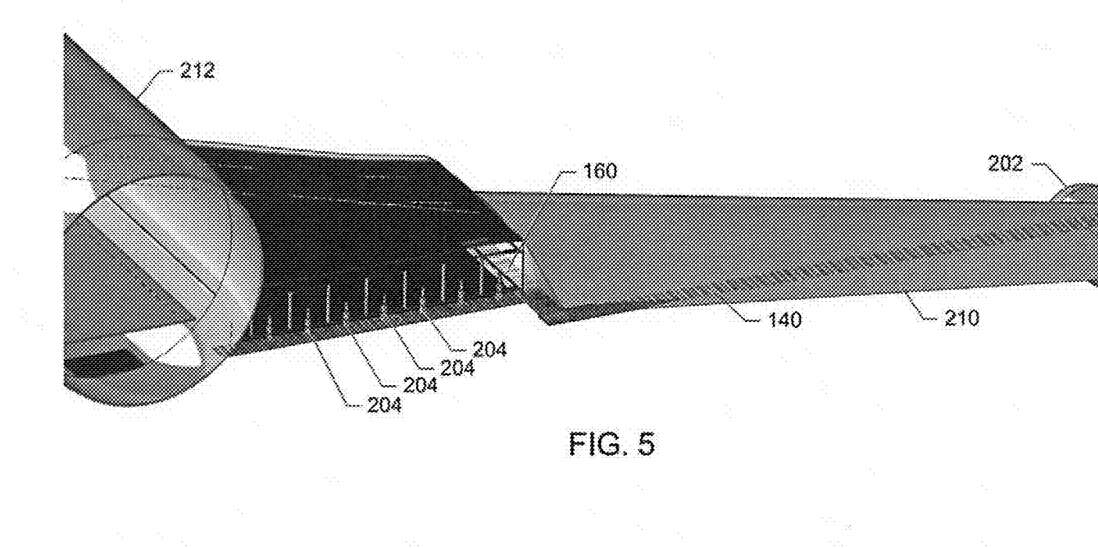
FIG. 5 is a close-up view of the wings section of the aircraft illustrating the location of the hollow acoustic wave tubes in accordance with aspects of the innovation.

Referring to FIGS. 1 and 2, based on the location of the heat exchangers 120 in the aircraft, the heat exchangers 120 may function as either a thermo-acoustic heat engine 120A or a heat pump 120B and include a hot heat exchanger 122, a cold heat exchanger 124, a regenerator 126, and a resonator 128.

Referring to FIGS. 1-5, in one example embodiment, the thermo-acoustic heat engines 120A are located near a rear 206 (near the exhaust) of the turbofan engines 202. The hot exchanger 122 is heated either externally or internally with hot gases from the turbofan aircraft engines 202. If the hot gases are channeled directly into the thermo-acoustic engine 120A then the thermo-acoustic engine 120A will act as a heat pump and will exhaust that air. The cold heat exchanger 124 is disposed on a hot side of the turbofan aircraft engines 202 located near the hot turbine exhaust. Jet fuel or air flows over the cold heat exchanger 124 for cooling purposes.

The thermo-acoustic heat engines 120A remove engine waste heat from the turbine exhaust using fins located parallel to exhaust flow from the aircraft engines 202 for flow straightening and a high heat transfer rate. The waste heat is absorbed by the hot heat exchanger 122 and travels through the regenerator 126 to the cold heat exchanger 124. As mentioned above, the temperature gradient between the hot and cold heat exchangers 122,124 efficiently creates mechanical energy in the form of the sound wave 170. The sound wave 170 propagates from the cold heat exchanger side as indicated by the arrow A in FIG. 2. The advantage to this form of energy is that no additional weight was added to the aircraft.

The sound wave 170 travels through the first hollow tubes 140 from the turbofan engine 202 to other areas in the aircraft 200 in a direction indicated by the arrow A1 (see FIG. 1). The representation of the thermal management system 100 and the aircraft 200 in FIG. 1 is a single line-type schematic diagram that shows only a single electric propulsion engine 204 and a single heat pump. It is to be understood, however, that the thermal management system 100 is configured to manage multiple electric propulsion engines 204 (see FIG. 5), multiple heat pumps, multiple electric components, etc.

The sound wave 170 is converted to electrical energy by transducers and is used to operate electric components 208, such as but not limited to, the electric components of the electric propulsion engine 204 (e.g., a generator, an electric motor, fans, etc.) or any other electric components associated with the aircraft. The electrical energy can also be used to operate the heat pump(s) 120B throughout the aircraft.

The heat pump(s) 120B serve a couple of functions. First, the heat pump(s) 120B captures or absorbs electrical component waste heat from the aircrafts electrical components through the cold heat exchanger 124 and transfers the waste heat to the hot heat exchanger 122 and dissipates the electrical component waste heat into the atmosphere using smaller heat exchangers. The hot heat exchanger 122 raises the reject temperature of the waste heat from the electric components. In one embodiment, for example, the heat pump(s) 120B may raise the reject temperature from approximately 100-200° C. to approximately 400-600° C. Higher reject temperatures translate into lighter radiator/convective heat exchanger weights to dissipate heat into atmosphere and higher quality heat can be pumped back into turbofan engines 202, as will be subsequently described.

A second function of the heat pump(s) 120B is to transfer waste heat back to the turbofan engines 202 to preheat the fuel and/or air. Thus, once the temperature of the waste heat is raised, as previously mentioned, a usable electrical component waste heat 180 is transferred from the heat pump(s) 120B back to the turbofan engines 202 via the second hollow tubes 160 in a direction indicated by the arrow A2. The usable waste heat 180 can be used to preheat the fuel and/or air to the turbofan engines 202, which increases the efficiency of the engines 202.

Still referring to FIGS. 1-5, in one embodiment, one or both of the first and second hollow tubes 140,160 can be added to the aircraft 200 and channeled through parts of the aircraft, such as the wing 210, fuselage 212, etc. Because the hollow tubes 140,160 are hollow and thin walled they add nearly no additional weight to the aircraft. In another embodiment, the hollow tubes 140,160 can be incorporated or integrated into the aircraft itself and serve to transfer the sound wave and waste heat. The integrated tubes can be pressurized with a gas, such as but not limited helium, and also be used as a support structure for the aircraft and, thus, would be near zero weight added to the aircraft.

Figure 6:
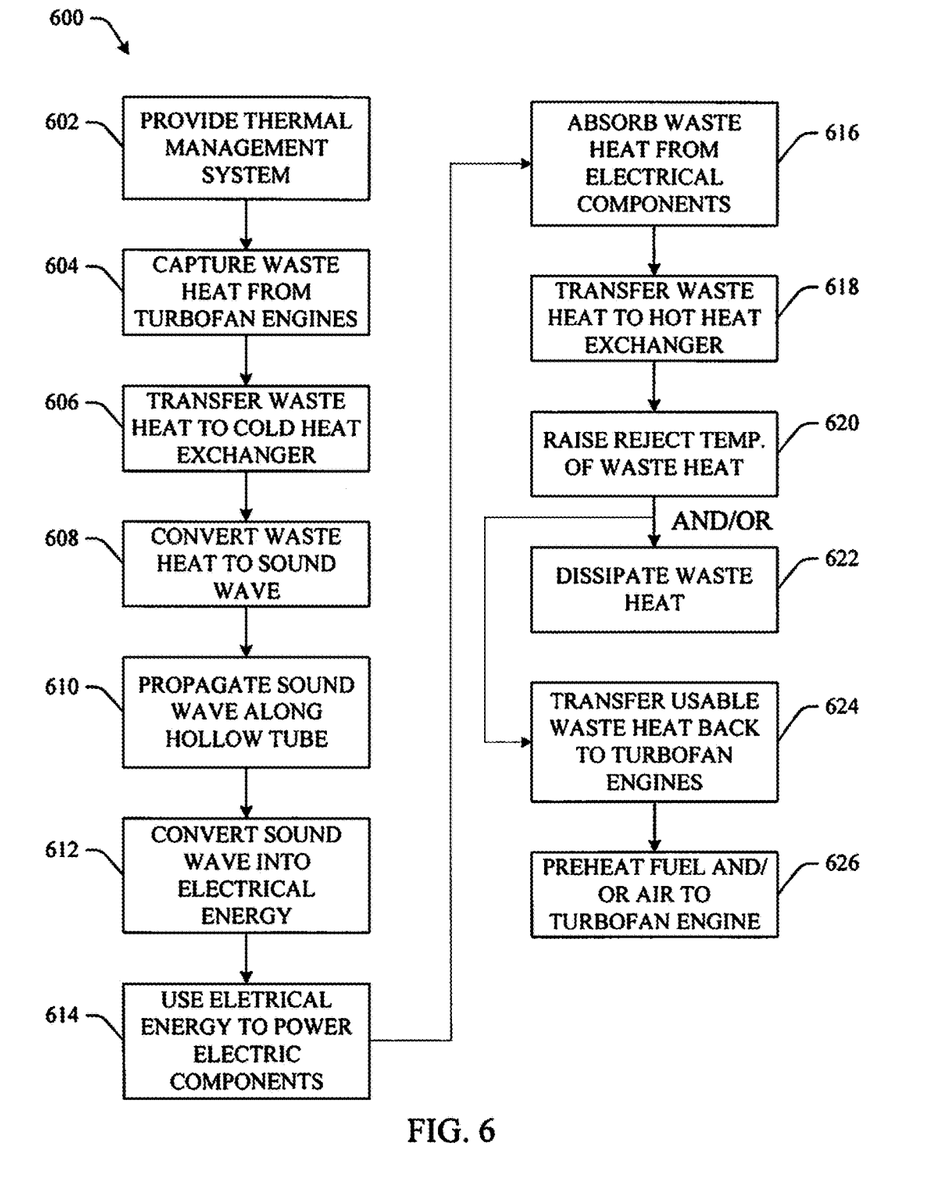
FIG. 6 is a block diagram illustration of a method to utilize waste heat from a turbofan engine to generate power, cool electrical components, and increase fuel efficiency of the aircraft in accordance with aspects of the innovation.

Referring to FIG. 6, a method 600 to utilize waste heat from a turbofan engine to generate power, cool electrical components, and increase fuel efficiency of the aircraft will now be described. At 602, a thermal management system 100 is provided that includes thermo-acoustic heat engines 120A, heat pumps 120B, and hollow tubes 140,160 that transfer mechanical energy and waste heat respectively. At 604, engine waste heat is captured by the hot heat exchanger 122 of the thermo-acoustic engines 120A. At 606, the waste heat is transferred to the cold heat exchanger 124. At 608, the waste heat is converted into mechanical energy and more specifically, into a sound wave 170 during transfer to the cold heat exchanger 124. At 610, the sound wave 170 propagates along a first hollow tube 140 to other areas of the aircraft having electrical components. At 612 the sound wave is converted into usable electrical energy as described herein. At 614, the electrical energy is delivered to and used to power electrical components including, but not limited to, electric propulsion engines. Thus, as described herein, the engine waste heat from the turbofan engines 202 is used to operate electrical components and also generate power or thrust. At 616, electrical component waste heat from the electrical components is absorbed by the cold heat exchanger 124 of the heat pump 120B. At 618, the electrical component waste heat is transferred to the hot heat exchanger 122 in the heat pump 120B. At 620, the hot heat exchanger 122 raises the reject temperature of the electrical component waste heat. At 622, the waste heat is dissipated into the atmosphere. Or at 624, the electrical component waste heat is used (usable waste heat 180) and is transferred back to the turbofan engines 202 and at 626, the usable waste heat 180 is used to preheat the fuel and/or air supplied to the turbofan engine 202. It is to be understood, that 622 and 624 can also occur simultaneously.

Advantages to the innovative thermo-acoustic thermal management system disclosed herein is that thermo-acoustic technology is light-weight and efficient due to the creation of an acoustic wave to deliver cooling energy to distal locations through the aircraft. This eliminates the need to deliver energy with electrical, mechanical, or fluid flow, each of which adds mass and complexity. For example, electrical power distribution produces EMI, heating, and requires heavy cables. Mechanical distribution such as distributed torque shafts adds weight and requires lubrication. In addition, pumping a cryogenic fluid requires a large volume of fluid, pumping mechanisms, extensive insulation, and heavy heat exchangers to transfer heat energy.

Rather, once the acoustic wave is formed it is a simple matter to channel the wave in small tubes to anywhere in the aircraft. Since there are no moving parts in the cold region both the reliability and mass are suitable for aircraft. In addition, there are no hot moving parts since the thermos-acoustic engine is used to create the pressure wave, which eliminates the need for lubrication and maintenance.

Based on existing thermo-acoustic devices, a performance of the system is expected to be as follows: first, a jet engine is about 40% efficient. With the exhaust temperature at 850° C. the thermo-acoustic engine is approximately 25% efficient. At cryogenic temperatures of 50K, rejecting heat to 300K the cryogenic cooler requires 20 W of energy input for every 1 W of heat lifted. So to lift 500 kW of heat would require 10 MW of acoustic energy input from the pressure wave generator or about 40 MW of thermal heat or mechanical energy from the turbo-generator. Delivering this much heat energy is difficult to deliver into a single unit externally. Rather, the innovative thermal management system 100 utilizes multiple pipes to reduce the transfer required per pressure wave generator. This is economical since each generator is essentially a hollow tube. Further, if the hot air is directly inserted under turbine pressure into the pressure wave generator the hot heat exchanger is not required.

Mass and weight savings are realized due to that the thermal management system does not require liquid cryogenic fluid, does not require an alternator, does not require power wiring, does not require plumbing insulation, does not require EMI protection, does not require a large recuperator, the thermal management system simply and effectively conducts heat transfer to fins. Some energy savings are realized due to the utilization of the waste heat from the turbofan engines, no power is required for driving turbo-alternator or cryogen pumps, the thermal management system is a light-weight system that does not burden aircraft drag, there is no heating due to power wiring, no heat is lost through plumbing insulation, and EMI protection is not required. Finally, cost savings of the innovative thermal management system are realized due to that lubrication or maintenance is not required, power conversion equipment is not required for driving turbo-alternator or cryogen pump, there is minimal modification to existing aircraft, and no risk of spark ignition due to high voltages.

The innovative thermal management system is ideal for aircraft because it does not require extra fuel to operate it, it is light-weight, and it is essentially maintenance-free. It can be used to provide cabin cooling, ambient/cryogenic cooling of converter, cables, and motors. In addition it can be used to deliver power to remote locations on the aircraft without using wires. A non-cooling application would be to use the waste heat from a turbofan jet engine to generate a pressure pulse and deliver that pulse to small electric motors that do not provide propulsion, but instead eliminate the boundary layer induced wakes behind aircraft to reduce drag. This increases the fuel efficiency since the aircraft drag is reduced while using the otherwise wasted aircraft energy.

What has been described above includes examples of the innovation. It is, of course, not possible to describe every conceivable composition, article, or methodology for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An aircraft comprising:
   a turbine engine generating turbine exhaust;
   a thermo-acoustic engine disposed proximate to an exhaust exit point of the turbine engine, wherein the thermo-acoustic engine includes a first heat exchanger, a regenerator, and a second heat exchanger, wherein the first heat exchanger, the regenerator, and the second heat exchanger are disposed within a resonator, wherein heat from the turbine exhaust heats the first heat exchanger such that there is a temperature gradient across the regenerator to generate an acoustic wave throughout the resonator via the thermoacoustic effect;
   a transducer configured to convert the acoustic wave into electrical energy; and
   an electrical component conductively connected to the transducer such that the electrical component receives the electrical energy, wherein the electrical energy powers operation of the electrical component.

2. The aircraft of claim 1, wherein the turbine engine is attached to a wing of the aircraft, wherein the resonator is channeled through the wing of the aircraft such that the acoustic wave propagates towards a fuselage of the aircraft.

3. The aircraft of claim 1, wherein the electrical component comprises a generator, an electric motor, or an electric fan.

4. The aircraft of claim 1, wherein the resonator is filled with a pressurized gas.

5. The aircraft of claim 4, wherein the pressurized gas comprises helium.

6. The aircraft of claim 1, wherein the electrical component generates waste heat, wherein the aircraft further comprises a heat pump configured to raise a temperature of the waste heat.

7. The aircraft of claim 6, wherein the raised temperature waste heat is transferred to the turbine engine via a heat pipe extending between the electrical component and the turbine engine.

8. The aircraft of claim 6, wherein the raised temperature waste heat is dissipated into the atmosphere.

9. The aircraft of claim 6, wherein the heat pump is an acoustic heat pump.

10. An aircraft comprising:
    a plurality of turbine engines;
    a plurality of thermo-acoustic engines heated by turbine exhaust generated by the plurality of turbine engines, wherein each of the thermo-acoustic engines includes a resonator, wherein the heating by the turbine exhaust establishes temperature gradients across regenerators disposed within the resonators, thereby generating acoustic waves in the resonators via the thermoacoustic effect;
    a plurality of transducers, wherein each of the transducers is communicably coupled to a separate one of the resonators and configured to convert the acoustic wave generated within that resonator into electrical energy; and
    an electrical component configured to utilize the electrical energy generated via the plurality of transducers.

11. The aircraft of claim 10, wherein the electrical component comprises a generator, an electric motor, or an electric fan.

12. The aircraft of claim 10, wherein at least one of the thermo-acoustic engines is configured to internally receive turbine exhaust from one of the turbine engines to generate a temperature gradient.

13. The aircraft of claim 10, wherein each of the resonators is filled with a pressurized gas.

14. The aircraft of claim 13, wherein the pressurized gas is helium.

15. The aircraft of claim 10, wherein at least one of the plurality of thermo-acoustic engines is disposed on an external surface of one of the turbine engines.

16. The aircraft of claim 15, wherein the turbine engines include exhaust fins disposed parallel to a flow of the turbine exhaust, wherein the at least one of the plurality of thermo-acoustic engines disposed on the external surface is disposed proximate to one of the exhaust fins so as to be externally heated by that exhaust fin.

17. The aircraft of claim 10, wherein the electrical component generates waste heat, wherein the aircraft further comprises a heat pump configured to raise a temperature of the waste heat.

18. The aircraft of claim 17, wherein the raised temperature waste heat is transferred to at least one of the turbine engines via at least one heat pipe extending between the electrical component and the at least one turbine engine.

19. The aircraft of claim 18, wherein the aircraft comprises a plurality of electrical components and a plurality of heat pumps, wherein each of the plurality of heat pumps is configured to receive waste heat from a separate one of the plurality of electrical components.

20. The aircraft of claim 19, further comprising a plurality of heat pipes extending from each of the plurality of heat pumps, wherein each of the heat pipes is configured to direct pumped waste heat from the electrical components either externally to the aircraft or to one of the turbine engines for fuel preheating.

* * * * *